(12) United States Patent
Faber

(10) Patent No.: US 7,163,228 B2
(45) Date of Patent: Jan. 16, 2007

(54) COLLAPSIBLE STROLLER

(76) Inventor: Elizabeth L. Faber, 10017 Spring Lake Ter., Fairfax, VA (US) 22030

( * ) Notice: Subject to any disclaimer, the term of this patent is extended or adjusted under 35 U.S.C. 154(b) by 106 days.

(21) Appl. No.: 11/108,787

(22) Filed: Apr. 19, 2005

(65) Prior Publication Data

US 2006/0232046 A1    Oct. 19, 2006

(51) Int. Cl.
*B62B 1/00*    (2006.01)
(52) U.S. Cl. .................. 280/651; 280/654; 280/87.051; 280/47.34; 280/647; 297/16; 297/441; 297/457; 297/440
(58) Field of Classification Search ........ 280/649–656, 280/87.051, 47.34
See application file for complete search history.

(56) References Cited

U.S. PATENT DOCUMENTS

| | | | |
|---|---|---|---|
| 2,068,295 A | | 1/1937 | Kramer |
| 2,429,763 A | | 10/1947 | Lindabury |
| 2,903,270 A | | 9/1959 | Ross |
| 3,084,949 A | * | 4/1963 | Forster et al. .............. 280/650 |
| 3,689,099 A | | 9/1972 | Patterson |
| 3,984,115 A | | 10/1976 | Miller |
| 4,083,579 A | | 4/1978 | Basey, Jr. et al. |
| 4,094,531 A | | 6/1978 | Cabagnero |
| 4,126,331 A | | 11/1978 | Sloan et al. |
| 4,256,325 A | | 3/1981 | Fleischer |
| 4,290,643 A | * | 9/1981 | Logan, 3rd. ............... 297/16.2 |
| D261,129 S | | 10/1981 | Perego |
| 4,354,689 A | | 10/1982 | Perego |
| 4,763,911 A | | 8/1988 | Gebhard et al. |
| 5,388,852 A | | 2/1995 | Bigo et al. |
| 5,513,864 A | | 5/1996 | Huang |
| 5,622,376 A | | 4/1997 | Shamie |
| 5,769,447 A | | 6/1998 | Huang |

(Continued)

FOREIGN PATENT DOCUMENTS

GB        2 334 489 A    8/1999

(Continued)

OTHER PUBLICATIONS

"Just Kid-in Around," available at: http://www.justkidnaround.com/strollers.htm, 5 pages, last visited Dec. 15, 2004.

*Primary Examiner*—Christopher P. Ellis
*Assistant Examiner*—Cynthia F. Collado
(74) *Attorney, Agent, or Firm*—Richard C. Litman

(57) ABSTRACT

A collapsible stroller having a collapsible chair having a seat portion, a back portion, and a pair of arms of foldable material such as textile cloth. The stroller has a collapsible frame having folding legs, folding arm supports, and rear uprights supporting the seat portion, the back portion and the pair of arms. The rear uprights extend beyond the seat portion and have upward open ends receiving an inverted "U"-shaped handle which is adjustable in height. The legs form four chair leg bases having wheeled castors extending downward from each base. The chair collapses radially inward so as to form a generally cylindrical configuration. The handle has a hinge at the upper center for folding. The collapsed chair portion with wheels is fitted into a zippered duffle-like bag having back loops for storage and carrying on the back of an adult. The folded handle also fits into the bag.

20 Claims, 7 Drawing Sheets

U.S. PATENT DOCUMENTS

| | | | |
|---|---|---|---|
| 5,803,470 A | 9/1998 | Smith | |
| 5,820,140 A | 10/1998 | Huang | |
| 5,845,917 A | 12/1998 | Huang | |
| 5,857,688 A * | 1/1999 | Swearingen | 280/250.1 |
| 5,971,409 A | 10/1999 | Butz | |
| 6,082,813 A * | 7/2000 | Chen | 297/16.2 |
| 6,105,997 A | 8/2000 | Watkins | |
| 6,231,119 B1 * | 5/2001 | Zheng | 297/16.2 |
| D452,192 S | 12/2001 | Hartenstine et al. | |
| D452,462 S | 12/2001 | Lan | |
| 6,354,619 B1 * | 3/2002 | Kim | 280/651 |
| 6,386,575 B1 | 5/2002 | Turner | |
| 6,682,135 B1 * | 1/2004 | Zheng | 297/16.2 |
| D486,428 S | 2/2004 | Daykin | |
| D486,429 S | 2/2004 | Daykin | |
| 2002/0041082 A1 | 4/2002 | Perego | |
| 2002/0074774 A1 | 6/2002 | Hsu et al. | |
| 2003/0057682 A1 | 3/2003 | Yoshie et al. | |
| 2003/0155746 A1 | 8/2003 | Watkins | |

FOREIGN PATENT DOCUMENTS

| | | |
|---|---|---|
| JP | 11-157453 | 6/1999 |

* cited by examiner

COLLAPSIBLE STROLLER

BACKGROUND OF THE INVENTION

1. Field of the Invention

The present invention relates to strollers for children. More particularly, the present invention relates to collapsible strollers.

2. Description of the Related Art

Collapsible strollers for babies and small children are well known and widely used. Known collapsible strollers, however, fold into a bulky and outsize configuration. Some provide for folding and carrying on the back of an adult, however they fold into a bulky, inconvenient collapsed configuration. Some collapsible strollers are inherently uncomfortable for the child. Although it is known to provide a folding configuration which may be placed in a carrying case and carried by a handle by an adult, the configuration remains bulky and relatively difficult to carry, handle, and store. It would be desirable to provide a collapsible stroller for a child which is inherently comfortable for the child. It would further be desirable if such a collapsible stroller would assume a generally cylindrical collapsed configuration for fitting in a soft, duffle-type bag having straps for convenient carrying on the back of an adult. This type of duffle bag is easily folded and compactly stored and carried by an adult when the collapsible stroller is erect and in use.

Japanese Patent Publication No. 11-157453, published Jun. 15, 1999, describes a folding stroller having a narrow front and rear leg bars in order to reduce the folded size of the stroller. United Kingdom Patent Publication No. 2,334,489 A, published Dec. 8, 1999, shows a foldable stroller with a locking member that prevents the upper and lower bridges on the stroller from moving to their folding positions. A web page published at www.justkidnaround.com, at least as of Dec. 15, 2004, discloses a stroller that converts to a baby-backpack that is constructed from lightweight aluminum.

None of the above inventions and patents, taken either singly or in combination, is seen to describe the instant invention as claimed. Thus, a collapsible stroller solving the aforementioned problems is desired.

SUMMARY OF THE INVENTION

The collapsible stroller of the present invention takes the general form of a small, collapsible director's chair of known construction having a folding frame and fabric seating structure. The stroller of the present invention is particularly useful for an older child who has the ability to sit erect. The frame of the collapsible stroller collapses radially inward toward a vertical centerline through the seat to form a generally cylindrical collapsed configuration which may easily fit into a duffle-type bag.

Castor wheels are provided on the leg bases of the chair to provide for easy handling of the stroller, the wheels being compact in size so as to conform to the generally cylindrical collapsed configuration desired. An adjustable-length, folding handle is provided which slidingly fits within the frame rear uprights for ease in handling the stroller during use. The folding handle easily fits within the duffle-type bag with the collapsed stroller. The stroller seat provides for flexible fabric arm rests for comfort and security of the child which easily fold with the frame. A five-point safety harness is provided for a small child, the harness having a crotch strap, lap belts and shoulder straps. The shoulder straps are removable to accommodate a larger child.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
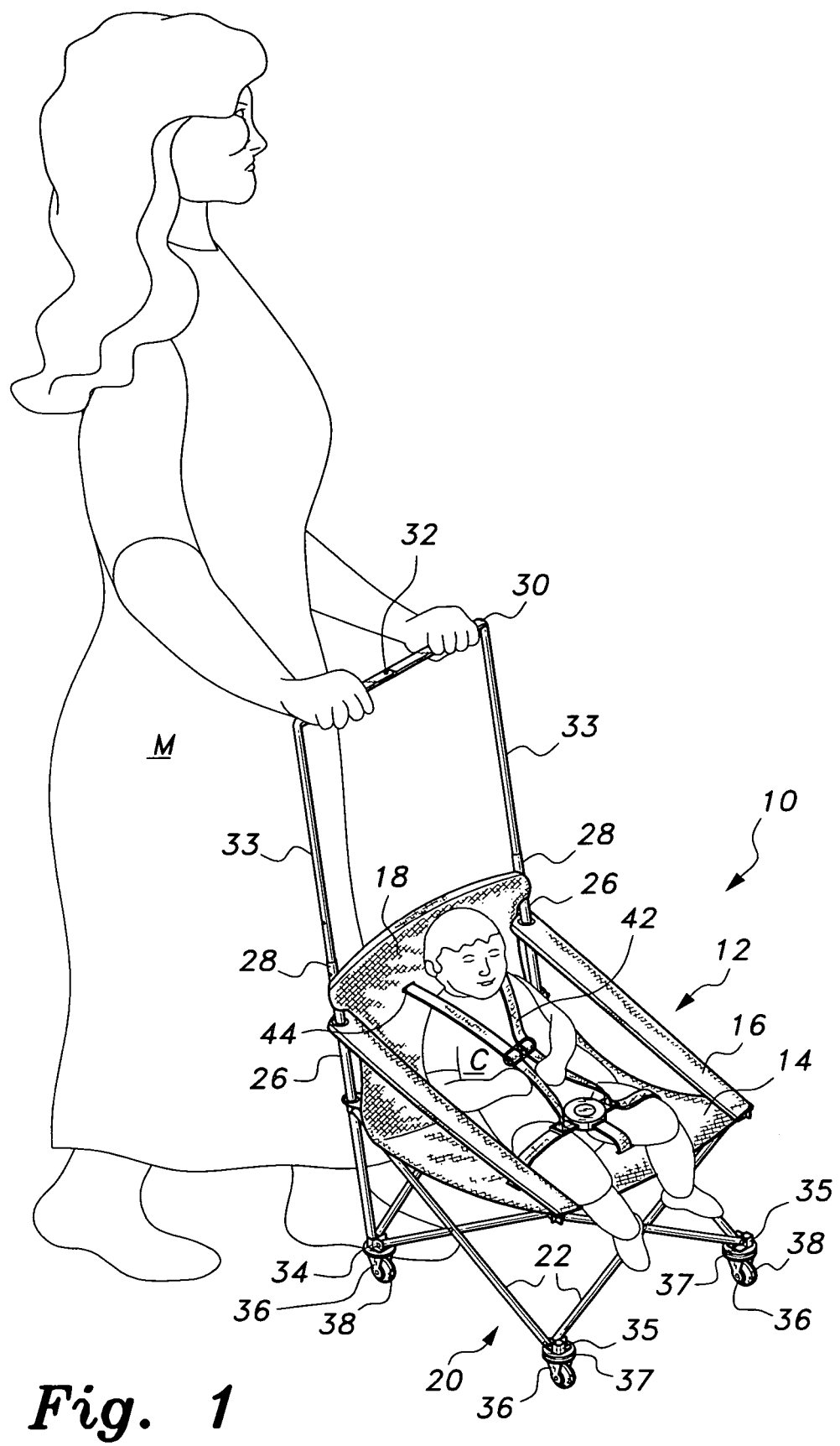
FIG. 1 is an environmental, perspective view of a collapsible stroller according to the present invention.

The present invention is a collapsible stroller for a child, the stroller being stowable in a duffle-like bag.

Referring to the figures, the child stroller of the present invention (see FIG. 1) is shown in use and referred to by the number 10. Folding stroller system 10 includes collapsible chair 12 having a seat portion 14, a back portion 18 and arms 16 of flexible, foldable material such as canvas or other fabric. Collapsible chair 12 includes a folding support frame 20 having folding legs 22 and frame tubular rear uprights 26 having open end portions 28 extending above back portion 18. Seat 12 is of such size as to carry a child C. Arms 16 may contain a cup holder 40 for holding a drinking cup D (see FIG. 2B).

An extendable folding handle 30 is generally inverted "U"-shaped and made of tubular material, the upright portions 33 being inserted within tubular frame rear upright open end portions 28 when folding chair 12 is in the erect position. The handle 30 may be adjusted relative to uprights 26 by sliding upward or downward therein for comfortable pushing of the stroller system 10 by an adult such as mother M. Detents 24 may be spaced along handle uprights 33 and upright open end portions 28 of conventional construction for positive adjustment of the height of handle 30. The folding handle 30 has a centrally located hinge 32 so as to fold when the chair 12 is collapsed.

Frame legs 22 rotatably extend upward from chair leg bases 34. Castors 36 are attached to each chair leg base 34 and extend downward to support wheels 38. When in the erect state, as in FIG. 2A, the wheels 38 and handle 30 provide for mobility for a child seated therein when pushed by means of handle 30 by an adult. The front castors 36 have spacers 37 separating them from leg bases 34 so as to tilt the chair 12 and handle 30 toward the rear, the incline helping maintain the child C in a comfortable position in chair 12 and provide ease of pushing the stroller.

Wheels 38 are preferably of the type used with in-line skates having a diameter of about 2½ to about 3 inches in diameter and having a relatively narrow width. It is anticipated that the stroller will be used on relatively flat surfaces such as sidewalks and in shopping malls. The relatively small size of the wheels allows for compact storage in a bag as described below which may be easily be stowed in a vehicle and carried to the locations where the stroller system 10 is most useful.

Figure 2A:
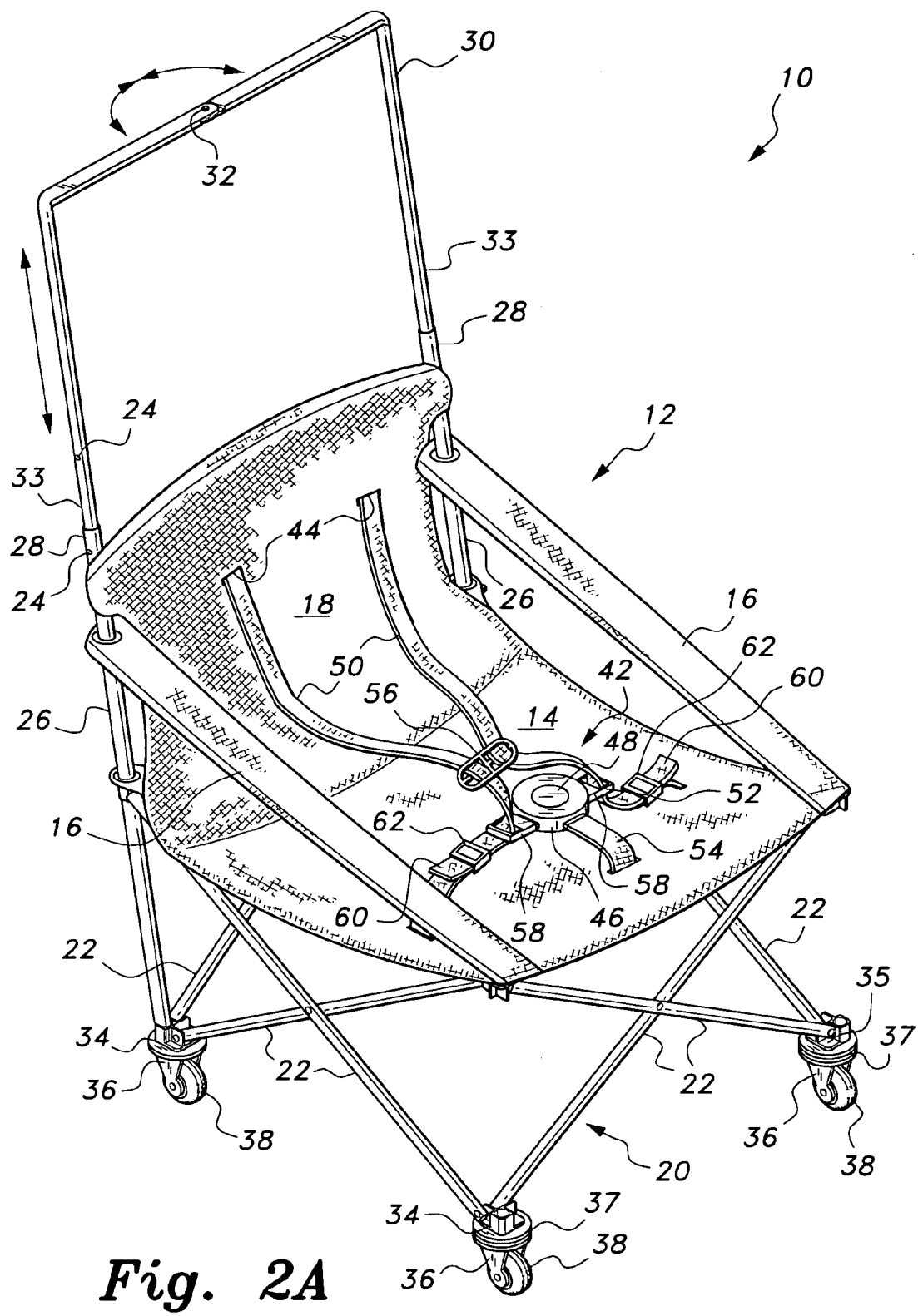
FIG. 2A is a perspective view of the stroller of FIG. 1 in an erected state.
Figure 2B:
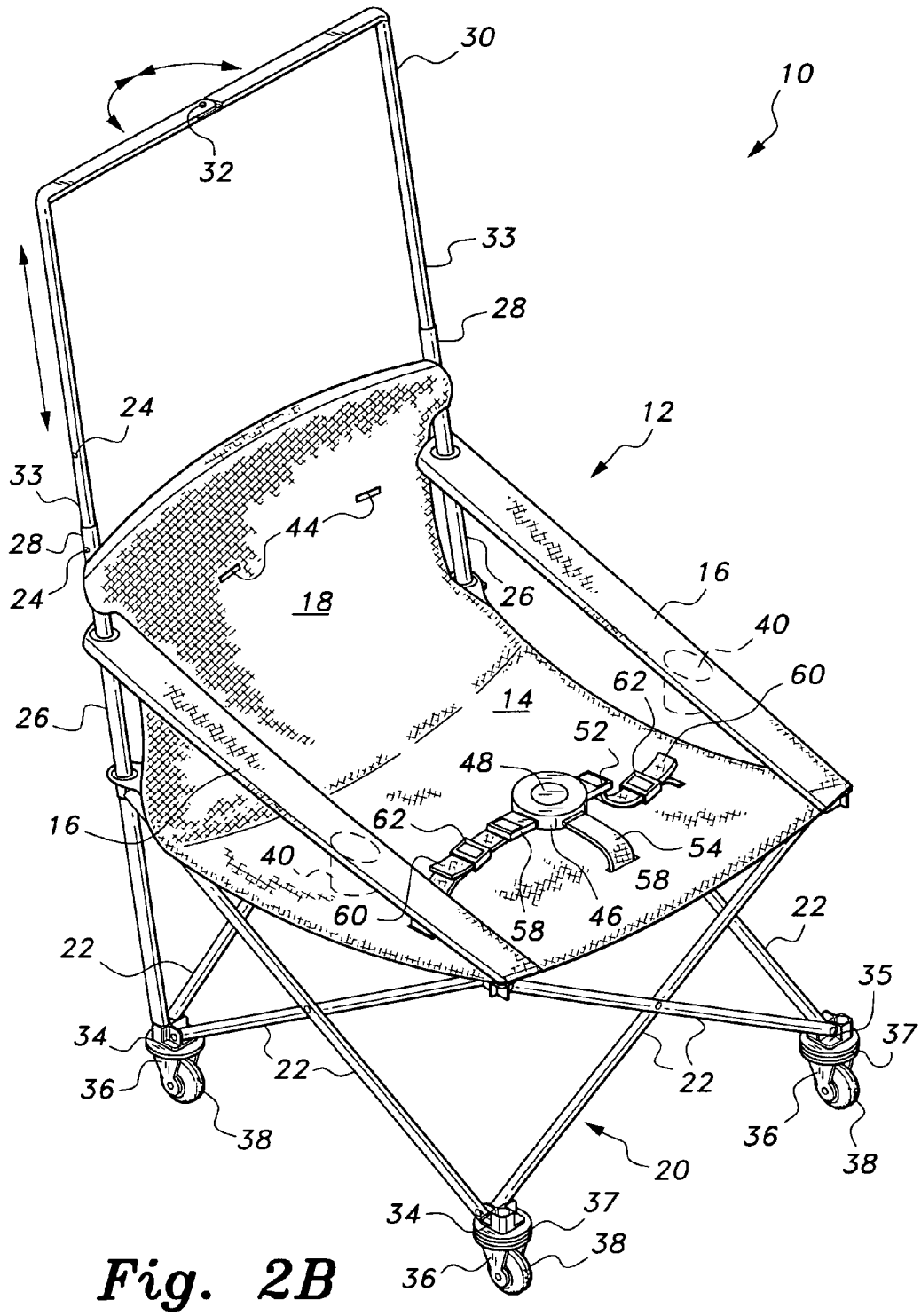
FIG. 2B is a perspective view similar to that of FIG. 2A modified by removal of the shoulder straps.

Referring to FIGS. 1, 2A and 2B, safety harness 42 keeps the child C safely seated in the stroller 10. The safety harness 42 is preferably a five-point harness having harness shoulder straps 50 extending through slots 44 in back 18 and extending through snap locks 58 to form lap straps 60. Adjusting buckle 56 allows adjustment of the shoulder straps 50 to a particular child. A crotch strap 54 may be permanently attached to harness receiving lock 46 or be removable by a snap lock 58 (not shown). A harness receiver lock release 48 such as a push button releases the snap locks 58. An alternative harness may have five separate straps and up to five corresponding lock releases 48 (not shown).

Referring to FIG. 2B, the five point harness 42 may be converted into a three point harness as the child matures by removing shoulder straps 50 and substitute separate lap straps 60 with adjusting buckles 62.

Figure 3:
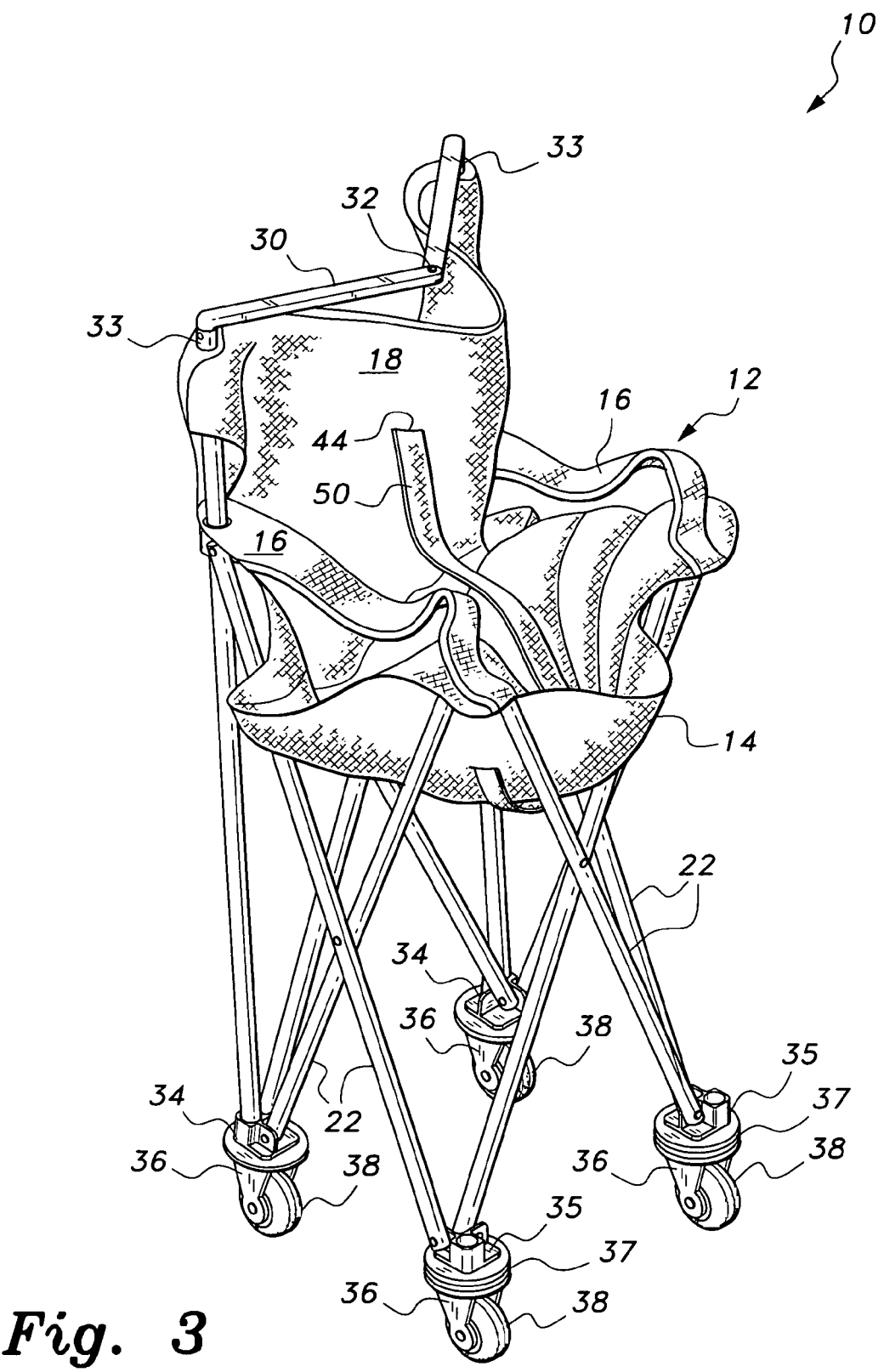
FIG. 3 is a perspective view of the stroller of FIG. 1 in a partially folded state.
Figure 4:
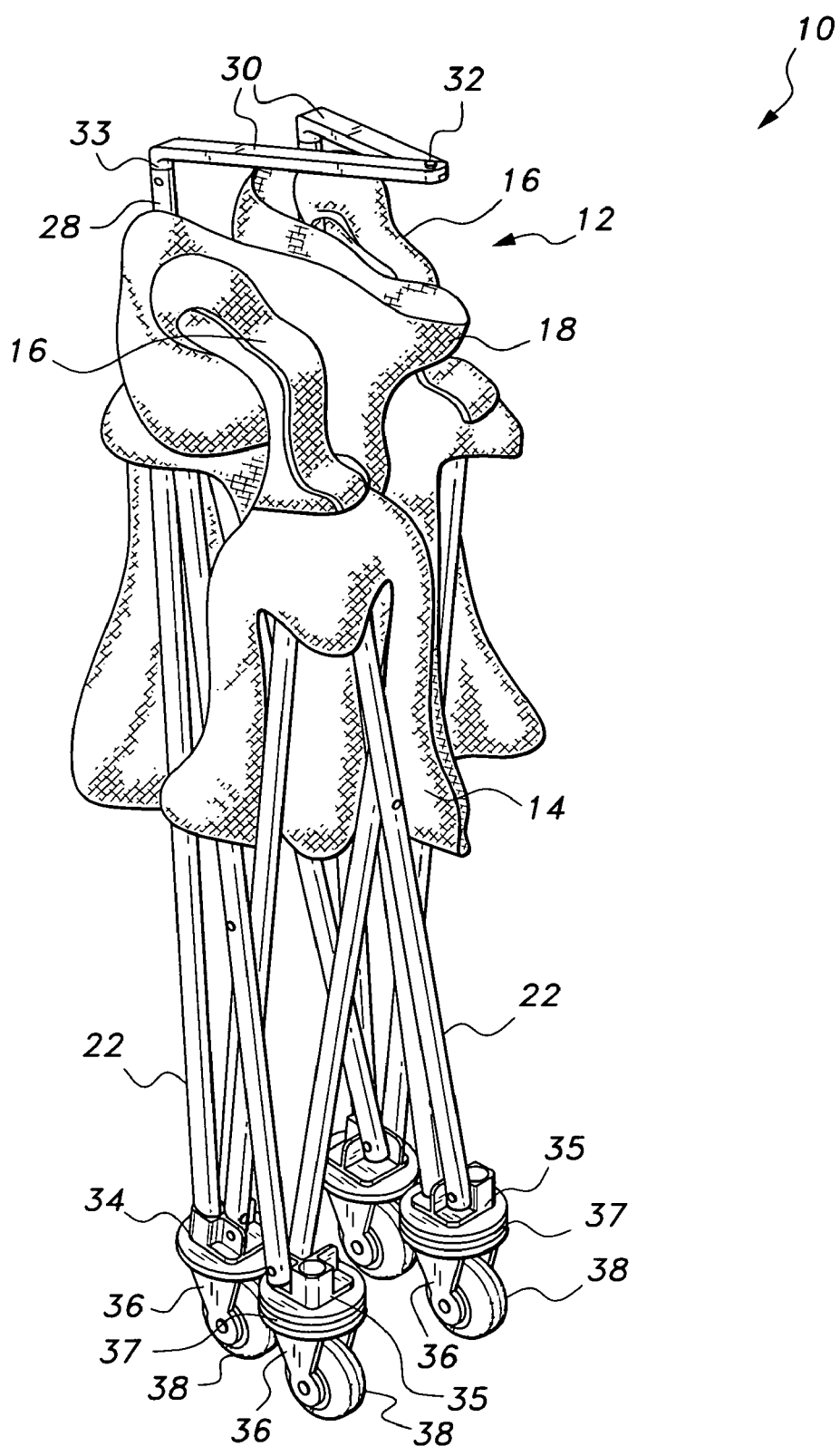
FIG. 4 is a perspective view of the fully folded stroller and handle of FIG. 1.

As is shown in FIGS. 2–4, the chair 12 is of the general configuration of a collapsible director's chair, as is presently available to the public, the design of which has been modified to include castor wheels 38 and to accommodate a handle 30. During collapsing of chair 12, the handle 30 is folded at hinge 32. This allows the chair 12, having the castor wheels 38 remaining intact, to collapse inward. The frame 20 folds radially inward with respect to a vertical line through the center of the seat portion 14, forming a generally cylindrical collapsed configuration.

Figure 5:
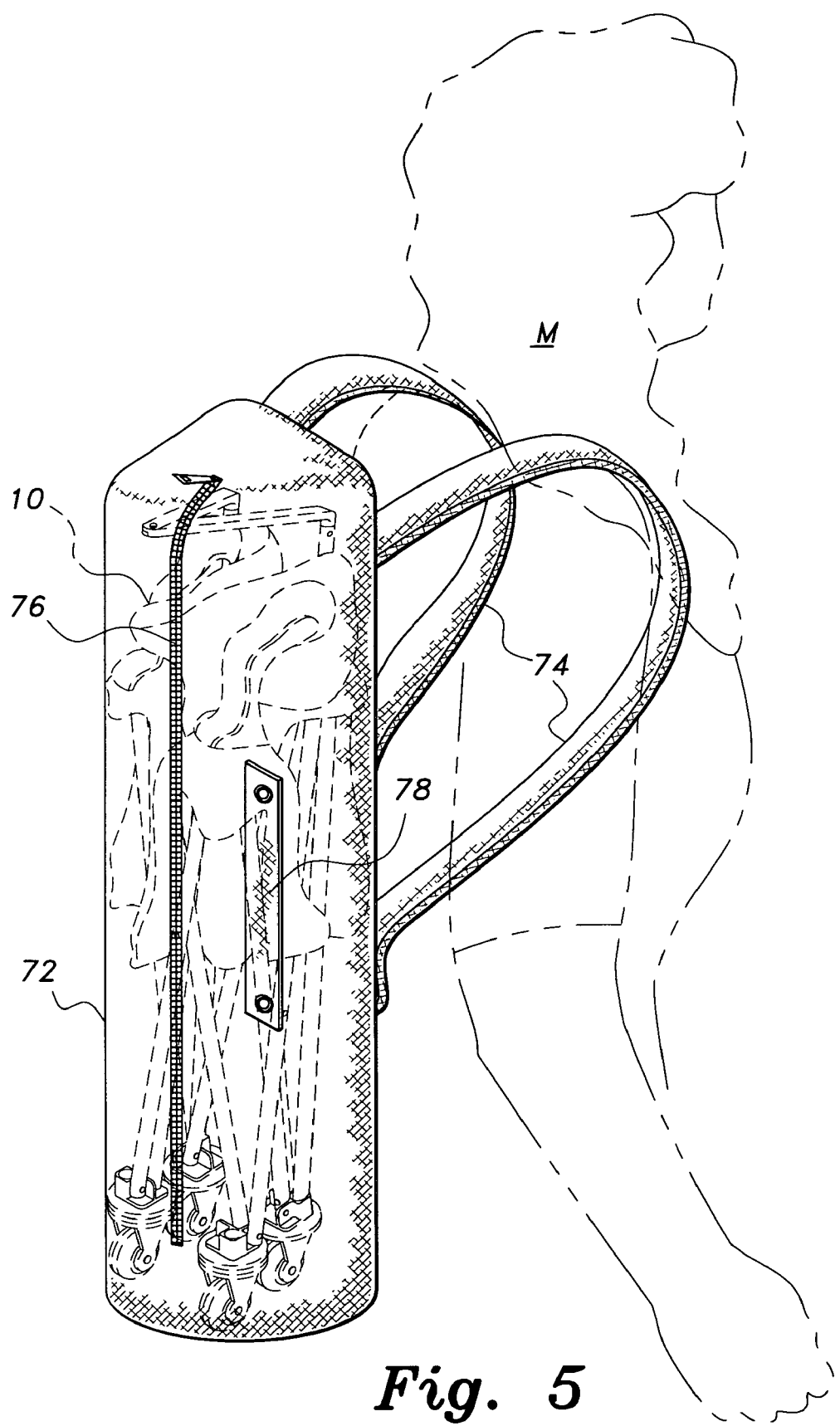
FIG. 5 is a perspective view of the fully folded stroller and handle as in FIG. 4 as stowed in a duffle-like bag.

Referring to FIG. 5, the chair 12 is shown collapsed into a generally cylindrical configuration and handle 30 folded at hinge 32 and slid downward into frame rear uprights 26. The chair 12 and handle 30 are inserted into a duffle-type stowage and carrying bag 72 through zippered closure 76. A mounting strap 78 is attached to the side of carrying bag 72 for attachment to stroller 10 during use (see FIG. 6, below), the bag 72 having shoulder straps 44 for carrying collapsible stroller system 10 in its collapsed form on an adult's back. The bag 42 is of flexible material such as fabric which allows for easy storing and carrying by and adult during use of the erected stroller.

Figure 6:
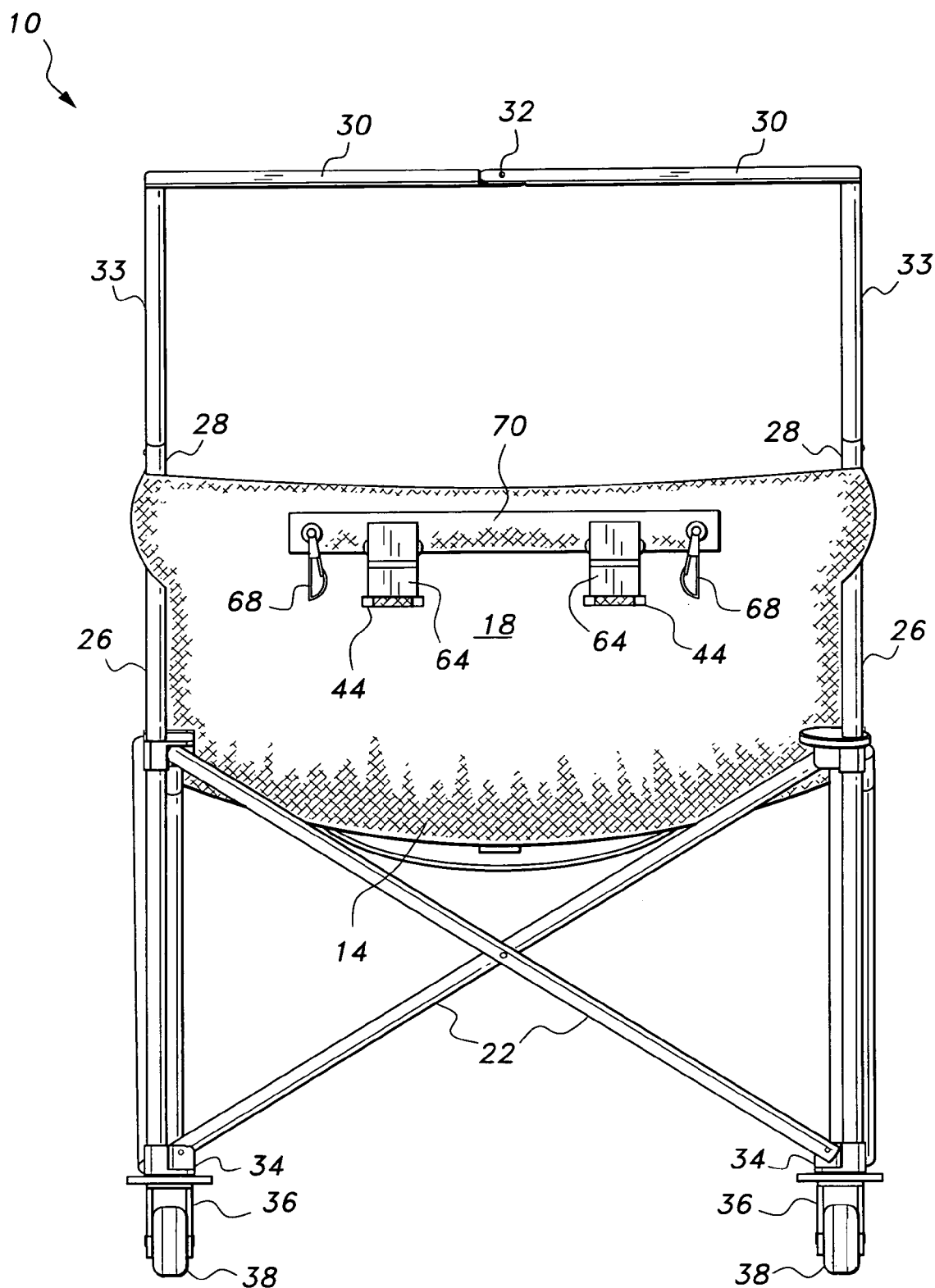
FIG. 6 is a rear elevational view of the stroller.

Referring to FIG. 6, there is shown a rear elevation view of the stroller system 10 in the erect configuration showing reinforcement strap 70 spaced above slits 44. The upper ends of harness shoulder straps 50 (see FIG. 2A) extend through slits 44 and are connected to reinforcement strap 70 by snap releasable buckles 64 of conventional design. The stowage bag 72 may be hung horizontally on the back 18 when stroller 10 is in use by snapping hook snaps 68 over snap support strap 78 of stowage bag 72 (see FIG. 5).

The stroller system 10 may be erected by reversing the steps above, the handle being slidingly adjustable within frame rear uprights 26 to a convenient height. A more positive adjustment system may be provided such as a series of spaced indents and detents 24 of well-known design.

It is to be understood that the present invention is not limited to the embodiment described above, but encompasses any and all embodiments within the scope of the following claims.

I claim:

1. A collapsible stroller system, comprising:
    a collapsible chair comprising:
        a seat portion;
        a back portion; and
        a pair of arms;
        each of said seat portion, back portion and pair of arms being of foldable material;
    a collapsible frame having a plurality of folding legs, and rear uprights;
    said folding legs and rear uprights supporting said seat portion, said back portion and said arms of said collapsible chair;
    said rear uprights extending upward beyond said seat portion and having respective open end portions; and
    an extendable inverted "U"-shaped handle slidingly engaged with respective said rear upright open end portions;
    said folding legs forming a plurality of chair leg bases;
    each said base having wheeled castors mounted thereon and extending downward to support wheels;
    whereby, upon erection, said collapsible chair receives said "U"-shaped handle in the open upright end portions forming a stroller for holding a child in the collapsible chair; and
    whereby, upon collapsing, said "U"-shaped handle slides downward into the frame upright end portions and the collapsed chair is stowable in a bag.

2. The collapsible stroller system of claim 1, said "U"-shaped handle having a centrally located hinge for folding said "U"-shaped handle into a compact unit for stowage with said collapsible chair.

3. The collapsible stroller system of claim 2, wherein at least one of said arms includes a cup holder.

4. The collapsible stroller system of claim 2, wherein said plurality of chair leg bases comprise two front leg bases and two rear leg bases, said two front leg bases having spacers separating said leg bases and said castors whereby said stroller is slanted rearward for comfort and ease in pushing.

5. The collapsible stroller system of claim 4, further comprising a harness for maintaining a child safely in said stroller.

6. The collapsible stroller system of claim 5, said harness being a five-point harness having two shoulder straps, two lap straps, and a crotch strap.

7. The collapsible stroller system of claim 6, said five-point harness being convertible to a three-point lap and crotch harness.

8. The collapsible stroller system of claim 4, said wheels being of the type employed with in-line skates being relatively narrow and having a diameter of about 2½ to about 3 inches.

9. The collapsible stroller system of claim 4, wherein said collapsible frame collapses radially inward relative to said seat portion so as to form a generally cylindrical collapsed configuration.

10. The collapsible stroller system of claim 9, further comprising a duffle-like bag for storing said collapsible stroller.

11. The collapsible stroller system of claim 10, said bag having a zippered closure and shoulder straps for carrying said collapsible stroller system in its collapsed form.

12. The collapsible stroller system of claim 11, said chair seat portion having a pair of hook snaps on the back thereof and said bag having a support strap thereon for receiving said pair of hook snaps for carrying said bag during use of said stroller.

13. A collapsible stroller system, comprising:
    a collapsible chair comprising:
        a seat portion;
        a back portion; and
        a pair of arms;
        each of said seat portion, back portion and pair of arms being of foldable material;

a harness attached to said chair for maintaining a child safely in said stroller;

a collapsible frame having folding legs, folding arm supports, and rear uprights;

said folding legs, folding arm supports, and rear uprights supporting said seat portion, said back portion and said arms of said collapsible chair;

said rear uprights extending upward beyond said seat portion and having respective open end portions; and an extendable inverted "U"-shaped handle slidingly engaged with respective said rear upright open end portions;

said "U"-shaped handle having a centrally located hinge for folding said "U"-shaped handle into a compact unit for stowage with said collapsible chair;

said folding legs forming four chair leg bases;

each said base having wheeled castors mounted thereon and extending downward to support wheels;

whereby, upon erection, said collapsible chair receives said "U"-shaped handle in the open upright end portions forming a stroller for holding a child in the collapsible chair; and whereby, upon collapsing, said "U"-shaped handle slides downward into the frame upright end portions and the collapsed chair is stowable in a bag.

14. The collapsible stroller system of claim 13, said harness being a five-point harness having two shoulder straps, two lap straps, and a crotch strap.

15. The collapsible stroller system of claim 14, said five-point harness being convertible to a three-point lap and crotch harness.

16. The collapsible stroller system of claim 13, further comprising a duffle-like bag for storing said collapsible stroller.

17. The collapsible stroller system of claim 16, said bag having a zippered closure and side-mounted shoulder straps for carrying said collapsible stroller system in its collapsed form.

18. The collapsible stroller system of claim 17, wherein said collapsible frame collapses radially inward relative to said seat portion so as to form a generally cylindrical collapsed configuration so as to readily fit within said bag.

19. The collapsible stroller system of claim 13, said wheels being of the type employed with in-line skates being relatively narrow and having a diameter of about 2½ to about 3 inches.

20. A collapsible stroller system, comprising:

a collapsible chair comprising:

a seat portion;

a back portion; and a pair of arms;

each of said seat portion, back portion and pair of arms being of foldable material;

a harness attached to said chair for maintaining a child safely in said stroller;

a collapsible frame having folding legs, folding arm supports, and rear uprights;

said folding legs, folding arm supports, and rear uprights supporting said seat portion, said back portion and said arms of said collapsible chair;

said rear uprights extending upward beyond said seat portion and having respective open end portions; and an extendable inverted "U"-shaped handle slidingly engaged with respective said rear upright open end portions;

said "U"-shaped handle having a centrally located hinge for folding said "U"-shaped handle into a compact unit for stowage with said collapsible chair;

said folding legs forming four chair leg bases;

each said base having wheeled castors mounted thereon and extending downward to support wheels; and a duffle-like bag for storing said collapsible stroller;

whereby, upon erection, said collapsible chair receives said "U"-shaped handle in the open upright end portions forming a stroller for holding a child in the collapsible chair; and whereby, upon collapsing, said "U"-shaped handle slides downward into the frame upright end portions and the collapsed chair is stowable in said bag.

* * * * *